UNITED STATES PATENT OFFICE.

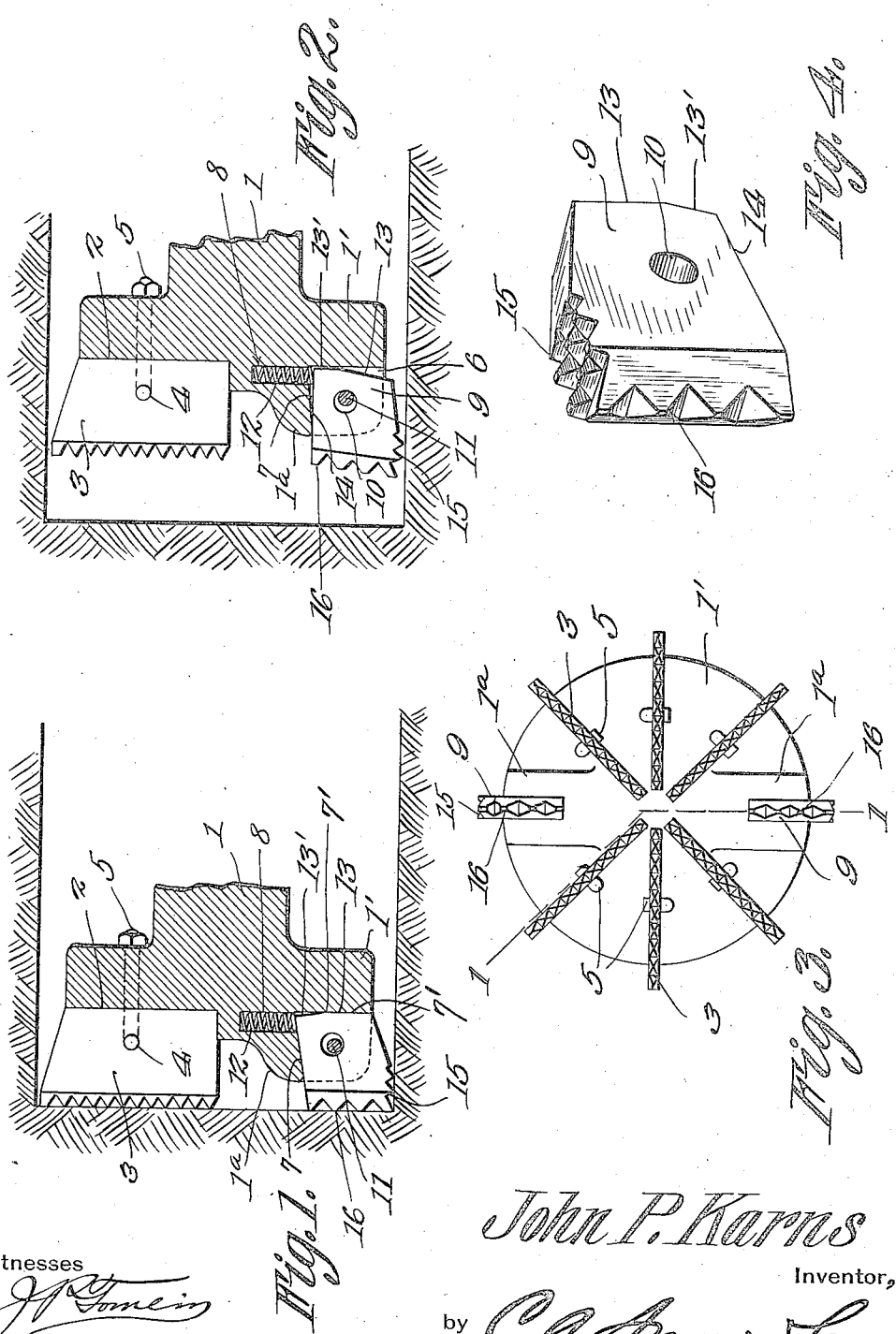

JOHN P. KARNS, OF BOULDER, COLORADO, ASSIGNOR TO J. P. KARNS TUNNELING MACHINE CO., OF BOULDER, COLORADO.

ROCK-REAMER FOR DRILL-HEADS.

1,156,147.      Specification of Letters Patent.     Patented Oct. 12, 1915.

Application filed March 28, 1913. Serial No. 757,451.

*To all whom it may concern:*

Be it known that I, JOHN P. KARNS, a citizen of the United States, residing at Boulder, in the county of Boulder and State of Colorado, have invented a new and useful Rock-Reamer for Drill-Heads, of which the following is a specification.

The present invention relates to improvements in rock reamers for drill heads, the same, being applicable to drill heads of various sizes, one object of the present invention being the provision of a drill head in which one, or more, of the reamers is so mounted as to avoid friction with the bore during retraction and advance and which will be automatically moved laterally when in contact with the header of the bore.

A further object of the present invention is the provision of a reamer for drill heads wherein the drill head is provided with one or more radially disposed pivotally mounted reaming cutters, there being provided means for retracting it, when out of contact or not under pressure, the working position of the same being caused by a blow against the header of the bore, such blow causing the reamer to be projected laterally and firmly locked against radial movement during the reciprocation and slight rotation of the drill head, thus reaming the bore so that the fixed cutters will have ample space to be moved back and forth without frictional contact with the walls of the bore.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings, Figure 1 is a transverse sectional view through a drill head constructed according to and embodying the present invention, the parts being in the position they assume when the head is projected forward and cutting. Fig. 2 is a similar view with the parts in the position they assume upon its withdrawal or retracting stroke. Fig. 3 is an end elevation of the head equipped with a plurality of cutters, Fig. 4 is a detail perspective view of one of the pivoted cutters.

Referring to the drawings, the numeral 1 designates the head shank, provided with the disk head 1', which is provided with one or more radial slots 2 in the face thereof, for the detachable reception of the fixed radial cutters 3, these cutters being provided with openings 4 for the engagement therewith of the retaining bolts 5.

In the form shown in Fig. 3, a plurality of the cutters 3 are employed, but these cutters are to be increased or decreased according to the size of the drill head.

In order to provide a means to permit of the proper attaching of the head upon the retractive stroke and also to permit of the proper projection of the cutters to perform the cutting work during the drilling operation, recesses 6 are provided radially in the enlarged portion 1ª of the head, the walls 7' being disposed at an acute angle to the wall 7 thereof and having led radially therefrom adjacent the inner portion thereof, a cylindrical bore or socket 8.

The cutter 9, provided with the cylindrical holes 10, is disposed to fit within the recess or slot 6 and be held against displacement from the head 1' by means of the pin 11, said pin 11 being of lesser diameter than the aperture or opening 10, so that the cutter 9 is permitted the relative movements, as clearly shown in Figs. 1 and 2.

A spring 12 is disposed in the socket 8, and bears against the edge 14 of the cutter 9 and under normal conditions pulls the cutter in the position, as shown in Fig. 2, the edge 13 of the cutter being provided with the foreshortened portion 13' so that the cutter 9 is disposed to assume the positions as shown in Figs. 2 and 1, and thus be locked in proper relation within the slot 6. The angular edge 14 is of the necessary angle or inclination to fit co-extensively with the wall 7 of the recess 6 so that when the head 1' strikes, with the parts in the position as shown in Fig. 1, the cutter will assume the position therein and thus assist in reaming the bore, the retracted movement of the head 1', due to the release of the cutting portions 15 and 16 from the wall of the bore, permitting the spring 12 to act upon the inner end of the cutter 9 to move it from the position as shown in Fig. 1 to that shown in Fig. 2, thus reducing the diameter of the drill head, or in other words permitting a slight collapsing thereof so that the retracted movement will in no way be retarded, due to the frictional engagement of the teeth 15 with the wall of the bore. It is also apparent that with this construction, the drill head may be readily withdrawn at the proper time from the bore and may also be inserted without the teeth 15 engaging the walls thereof and causing the movement of the cutters to the position as shown in Fig. 1. This position is caused due to the cutters 16 engaging the extreme inner end of the bore primarily, such action causing the cutter to be moved from the position as shown in Fig. 2 to that shown in Fig. 1 and thus throwing the reaming teeth 15 into engagement with the wall of the bore adjacent the end thereof. By this means the pivoted resiliently supported cutters 9 will cut the wall of the bore adjacent the end thereof while the teeth of the cutter 3 will act primarily upon the end.

It will thus be seen that the reamer has two striking surfaces of steel points, one of which strikes the header of the bore or tunnel while the other strikes the walls or sides to increase the diameter of the bore for the easy movement of the drill head. By mounting the reamer or cutter upon the pin, the pin forms a pivot therefor when not under a blow, and does not receive the effect of the blow when the cutter is moved from released to impact position, the cavity or recess in which the reamer is mounted being especially designed for this purpose. It will also be noted that the spring is so positioned at one side of the cavity as to press against the inner side of the reamer below the pin, thus pushing the pointed surface of the reamer that strikes the wall of the tunnel away therefrom, holding the same in such position during both the back and forward stroke of the drill head, the pointed surface that strikes the header of the tunnel being held forward and slightly in advance of the regular cutting points of the drill head. By this action, the header engaging cutting points of the reamer will engage the header of the tunnel slightly in advance of the regular cutting points of the drill head, and the other cutting points thereof will be thrown into contact with the side wall of the tunnel so that the wall at such point will be chipped to enlarge the tunnel diameter and thus permit free action of the drill head at all times.

What is claimed is:

1. In a device of the class described, a head; an end cutter carried thereby; and a reamer mounted on the head and including a front cutting edge and a side cutting edge, one corner of the reamer being in advance of the cutter and operating by impact to move both of the cutting edges of the reamer to active positions, the reamer having angularly disposed edges which contact simultaneously with the head to support the reamer in active position, the reamer being bodily and eccentrically movable about a fixed point to effect a shifting of the reamer.

2. In a device of the class described, a head; an end cutter on the head; and a reamer mounted on the head and including a front cutting edge and a side cutting edge, one corner of the reamer being in advance of the cutter and operating by impact to move both of the cutting edges of the reamer to active position, the reamer having angularly disposed transverse and longitudinal edges, the longitudinal edge engaging the head to hold the cutting edges in active position, and the transverse edge engaging the head to hold the cutting edges in inactive position, the reamer being bodily and eccentrically movable about a fixed point to effect a shifting of the reamer; and spring means coacting with the reamer to shift the same to inactive position.

In testimony that I claim the foregoing as my own, I have hereto affixed my signature in the presence of two witnesses.

JOHN P. KARNS.

Witnesses:
 SELINA WILLSON,
 SHIRLEY DAVIS.